United States Patent [19]

Harnden, Jr.

[11] 3,743,996
[45] July 3, 1973

[54] PROTECTIVE PADS FOR ELECTRICAL DEVICES

[75] Inventor: John D. Harnden, Jr., Schenectady, N.Y.

[73] Assignee: General Electric Company, Schenectady, N.Y.

[22] Filed: Oct. 21, 1971

[21] Appl. No.: 191,218

[52] U.S. Cl. ................ 338/21, 317/9 AC, 317/31
[51] Int. Cl. ........................................... H01c 7/12
[58] Field of Search ................... 338/13, 20, 21; 317/238, 31, 9 R, 9 AC, 33 R; 252/461

[56] References Cited
UNITED STATES PATENTS
2,075,733  3/1937  Lazarus .................................. 338/20
3,024,435  3/1962  Rollins et al. ......................... 338/20

OTHER PUBLICATIONS
Pettus, C. et al., Molybdenum Oxide Negative Resistance Devices, "IBM Technical Disclosure Bulletin" Vol. 7, No. 3, August 1964.

Primary Examiner—C. L. Albritton
Attorney—John F. Ahern et al.

[57] ABSTRACT

A plurality of elongated lead-in electrodes are hermetically sealed in a wafer of metal oxide varistor material and extend therethrough. The portions of the wafer in contact with said electrodes are spaced to provide a current flow between the electrodes which is low when normal operating voltage appears across the electrodes and when voltages in excess of normal voltage appear progressively thereacross a rapidly decreasing impedance is presented by the wafer in accordance with the alpha of the body of material, thereby limiting the voltage appearing between the electrodes.

9 Claims, 9 Drawing Figures 3,743,996

PROTECTIVE PADS FOR ELECTRICAL DEVICES

PROTECTIVE ELECTRICAL FEED-THROUGH ASSEMBLIES FOR ENCLOSURES FOR ELECTRICAL DEVICES

The present invention relates to electrical feed-through assemblies associated with enclosures for providing electrical connections to electrical devices included in the enclosure and in particular to such assemblies which provide electrical protection to such devices from surge and other spurious electrical voltages.

Electrical devices such as semiconductor devices are subject to electrical transient voltages or surges which are developed in the circuits in which they are used and also which come from external sources such as lightning, and are conducted to the devices along the power lines for the devices. Heretofore, a certain degree of protection against such surges has been provided by means of fast acting electrical fuses connected in circuit with the electrical device. Such fuses have not been entirely satisfactory in view of the fact that a certain time delay occurs between the occurrence of a surge and the subsequent interruption of the circuit by the fuse. With fast rising surges of large amplitude, such fuses do not act fast enough to protect sensitive electrical devices from damage.

Accordingly, an object of the present invention is to provide surge protection to electrical devices which is fast acting.

Prior art surge protection techniques required the use of additional circuit or structure elements to achieve the desired result.

Another object of the present invention is to provide feed-through assemblies for enclosures for electrical devices which in addition to providing a feed-through function also provides the protection against electrical surges without the need for separate or additional elements.

Another object of the present invention is to provide a feed-through assembly which provides good heat dissipation capability as well as surge protection.

In carrying out the present invention, in one illustrative embodiment thereof, there is provided a hermetically sealed electrical feed-through assembly including a body of metallic oxide varistor material having a pair of opposed surfaces. An elongated electrode is provided extending through the body from one of the opposed surfaces to the other of the opposed surfaces and hermetically sealed thereto. Another electrode is provided in contact with the body and hermetically sealed thereto. The electrode may take the form of an elongated electrode, also extending through the body from one of the opposed surfaces to the other of the opposed surfaces. The material has an alpha in excess of 10 in a current density range of $10^{-3}$ to $10^2$ amperes per square centimeter. The portions of the body in contact with the electrodes are spaced to provide a current flow between the electrodes which is low when normal operating voltage appears across the electrodes and when voltages progressively in excess of normal voltage appear thereacross, a rapidly decreasing impedance is presented by the body in accordance with the alpha of the material of the body, thereby limiting the voltage appearing between the electrodes.

The novel features which are believed to be characteristic of the present invention are set forth in the appended claims. The invention itself, however, together with further objects and advantages thereof may best be understood by reference to the following description taken in connection with the accompanying drawings wherein, FIG. 1 is a perspective view of a feed-through assembly as applied to a housing or enclosure for a semiconductor device, partially disassembled to show the manner of fabrication thereof.

Figure 1:
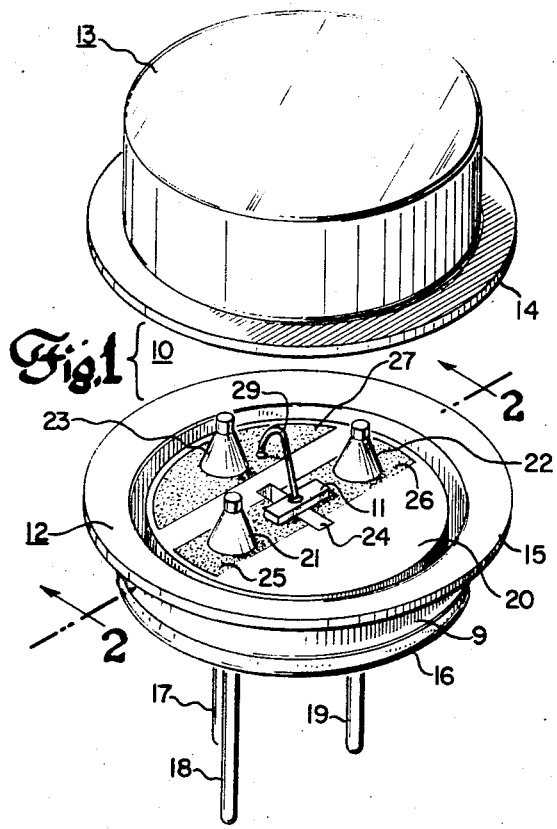
Figure 2:
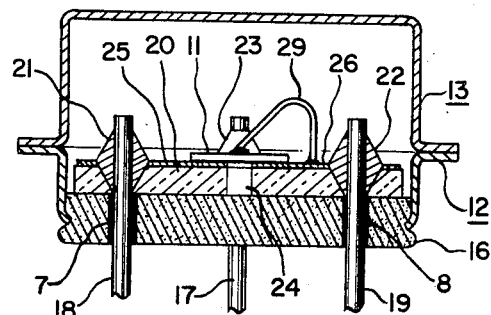
FIG. 2 is a side view in section of the assembled device of FIG. 1 taken along section 2—2 of FIG. 1 showing the construction thereof in accordance with the present invention.

Referring now to FIGS. 1 and 2, there is shown a hermetically sealed enclosure 10 for a semiconductor device 11 comprising the header assembly 12 and a cap member 13. Upon completion of fabrication of the header assembly 12, flange portion 14 of cap 13 is welded or soldered to mating flange 15 of header assembly 12 to provide a hermetically sealed enclosure for the semiconductor device 11. The header assembly 12, which provides the electrical feed-through connections to the semiconductor device, comprises a base portion 16 in which are embedded a plurality of elongated conductors or leads 17, 18, and 19 and which is surrounded by a cylindrical conductive member 9 having a flange portion 15 adapted to engage flange portion 14 of the cap 13. The semiconductor device 11 is mounted on a platform or block 20 which may be made of any suitable insulating material such as ceramic or glass and is provided with a plurality of holes 21, 22, and 23 extending therethrough from one major surface or face to the opposite major surface thereof and in addition is provided with a centrally located slot 24. On major face of the platform is also provided with a plurality of metallized areas 25, 26, and 27, two of which are contiguous to the slot 24 and each of which adjoins a respective hole. The semiconductor device 11, shown in this case in the form of a bar of semiconductor material which has a pair of regions of one conductivity type and an intermediate region of the opposite conductivity to form a transistor device, is conductively secured at its ends to the metal oxide areas contiguous to the slot by means of a suitable solder. A flexible wire-like conductor 29 is fused to the intermediate region or portion of the bar 11 and soldered to the metallized area 27. The ceramic block 20 is then securely held in place on the insulating base portion 16 by a solder bond between each of the leads 17, 18, and 19 and the metallized portions 25, 26, and 27. The presence of the slot 24 in the ceramic platform 20 ensures separation of the conductive areas of the ceramic platform and hence also assures that the intermediate region of the bar 11 will be free of conductive contact with either of the metallized areas 25 and 26. While a mounting assembly for a particular semiconductor device has been shown for inclusion in a hermetically sealed enclosure with a portion of the enclosure being provided with feed-through leads, such assembly is included simply for purposes of illustration of the manner of application of the present invention.

The base portion 16 of the header assembly is in the form of a wafer having a pair of opposed major faces with the leads 17, 18, and 19 extending through the wafer from one major face to the opposite major face thereof and hermetically sealed thereto.

The base portion or wafer 16 is constituted of a metal oxide varistor material such as described in Canadian Pat. No. 831,691, which has a nonlinear voltage versus current characteristic. The metal oxide varistor material described in the aforementioned patent is constituted of fine particles of zinc oxide with certain additives which have been pressed and sintered at high temperatures to provide a composite body or wafer of material. The current versus voltage characteristics of the composite body is expressed by the following equation:

$$I = (V/C)^\alpha \quad (1)$$

where $V$ is voltage applied across a pair of opposed surfaces or planes, $I$ is the current which flows between the surfaces, $C$ is a constant which is a function of the physical dimensions of the body as well as its composition and the process used in making it, $\alpha$ is a constant for a given range of current and is a measure of the nonlinearity of the current versus voltage characteristic of the body.

In equation (1), when $V$ is used to denote voltage between opposed surfaces or planes of a unit volume of material, or voltage gradient, current flow through the unit volume of material in response to the voltage gradient becomes current density. For the metal oxide varistor material for current densities which are very low, for example, in the vicinity of a mircroampere per square centimeter, the alpha ($\alpha$) is relatively low, i.e., less than 10. In the current density range of from $10^{-3}$ to $10^2$ amperes per square centimeter, the alpha is high, i.e., substantially greater than 10 and relatively constant. In the current density ranges progressively in excess of $10^2$ amperes per square centimeter, the alpha progressively decreases. When the current versus voltage characteristic is plotted on log-log coordinates, the alpha is represented by the reciprocal of the slope of the graph in which current density is represented by the abscissa and voltage gradient is represented by the ordinate of the graph. For a central range of current densities of from $10^{-3}$ to $10^2$ amperes per square centimeter, the reciprocal of the slope is relatively constant. For current densities below this range, the reciprocal of the slope of the graph progressively decreases. Also for current densities above this range, the reciprocal of the slope of the graph progressively decreases.

Figure 3:
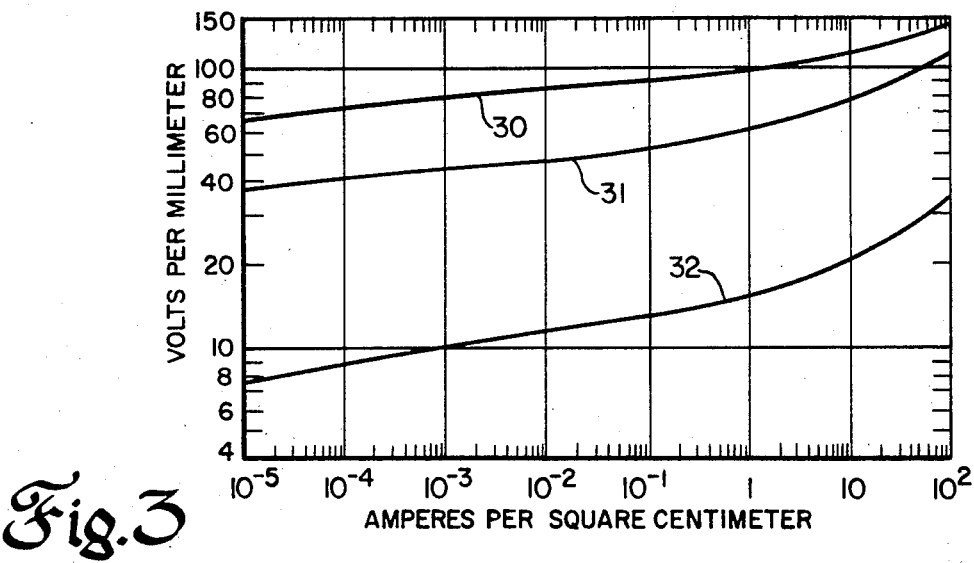
FIG. 3 shows graphs of the electrical characteristics of three materials of differing voltage gradients and alphas suitable for utilization in the feed-through devices of the present invention.

The voltage gradient versus current density characteristics of three types of material in log-log coordinates are set forth in FIG. 3. Graphs 30 and 31 are materials of high voltage gradient material and graph 32 is a graph of low voltage gradient material. For all of the graphs in the current density range from $10^{-3}$ to $10^2$ amperes per square centimeter, the alpha is high and is substantially greater than 10 and relatively constant. For current densities progressively greater than $10^2$ per square centimeter, the alpha progressively decreases. For current densities progressively less than $10^{-3}$ per square centimeter, the alpha also progressively decreases.

As the metal oxide varistor material is a ceramic material, the surfaces thereof may be metallized for facilitating electrical connections thereto in a manner similar to the manner in which other ceramic materials are metallized. For example, Silver Glass Frit, DuPont No. 7713, made by the DuPont Chemical Company of Wilmington, Delaware, may be used. Such material is applied as a slurry in a silk screening operation and fired at about 550° C to provide a conductive coating on the surface. Other methods such as electroplating or metal spraying could be used as well.

The nonlinear characteristics of the metal oxide varistor material results from bulk phenomenon and is bidirectional. The response of the material to steep voltage wave fronts is very rapid. Accordingly, the voltage limiting effect of the material is practically instantaneous. Heat generation occurs throughout the body of material and does not occur in specific regions thereof as in semiconductor junction devices, for example. Accordingly, the material has good heat absorption capability as the conversion of electrical to thermal energy occurs throughout the body of material. The specific heat of the material is 0.12 caloric/°C/gram. Accordingly, on this account, as well, heat absorption capability of the material is advantageous as a surge absorption material. The heat conductivity of the material is about one-half of the heat conductivity of alumina. Accordingly, any heat generated in the material may be rapidly conducted from the material into appropriate heat sinks.

The material, in addition to the desired electrical and thermal characteristics described above, has highly desirable mechanical properties. The material has a fine grain structure, may be readily machined to a smooth surface and formed into any desired shape having excellent compressive strength. The material is readily molded in the process of making the same. Accordingly, any size or shape of material may be readily formed for the purposes desired. Also, the coefficient of expansion of metal oxide varistor material is comparable to the coefficient of expansion of glass, silica, and the like.

In the case of the base portion 16 of metal oxide varistor material, holes are machined into the material of appropriate size to receive the electrodes or leads. The leads 17, 18, and 19 may be of electrode stock such as are used conventionally for electrodes or leads for use in glass or ceramic headers having a coefficient of expansion comparable to the coefficient of expansion of glass. The interior regions of the holes are metallized as indicated by cylinders 7 and 8 by one of the processes described above. The leads are inserted in place in the face member and the material fired to provide a hermetic seal.

The materials which may be used for the header enclosure are materials which have temperature coefficient of expansion matching that of glass. Such material may be alloys of iron, nickel, and cobalt of various proportions well known in the art for this purpose. One such material is fernico having a coefficient of expansion similar to the coefficient of expansion of glass and which hermetically bonds thereto.

The leads 17, 18, and 19 in the metal oxide varistor material base member 16 are spaced from one another and from the header enclosure 9 to provide high impedance at normal operating voltages between any two such electrodes for the specific metal oxide varistor material utilized. Of course, when the spacings of the leads with respect to one another are fixed by standard practice, the particular metal oxide varistor material utilized is selected to provide the desired voltage versus current characteristic which limits the amplitude of transient voltage surges which may appear across any of a pair of leads or a lead and the external casing 9.

Figure 4:
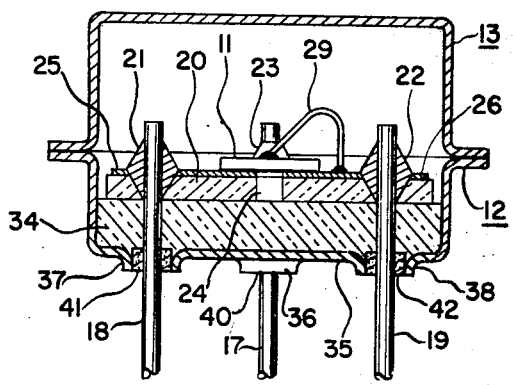
FIG. 4 is a side view in section of another embodiment of the present invention.

Referring now to FIG. 4, there is shown another embodiment of the present invention similar to the embodiment of FIGS. 1 and 2 and identical elements are identically designated. The base member 34 of the header assembly 12 is made of a suitable glass and is bonded to a metallic supporting plate 35 which has a plurality of large openings 36, 37, and 38 therein, each adapted to register with respective electrode or leads 17, 18, and 19 of the device. The plate 35 may be made of a material such as fernico which has a thermal coefficient of expansion matching that of glass and ceramic. A plurality of small cylinders 40, 41, and 42 of metal oxide varistor material are provided for leads 17, 18, and 19, respectively. The inner diameter of a cylinder is made slightly greater than the outer diameter of a lead and the outer diameter of a cylinder is made slightly smaller than the inner diameter of the apertures of the plate 35. The cylinders 40, 41, and 42 are conductively secured along their inner cylindrical surfaces to respective leads 17, 18, and 19 and their outer cylindrical surfaces are conductively secured to the surfaces of the respective apertures 36, 37, and 38 in plate 35. The material and dimensions of each of the individual cylindrical elements is selected to provide the proper voltage versus current characteristic between the electrical leads 17, 18, and 19 of the device such that the current flow between the leads is low when normal operating voltages appear across the electrodes and when voltages in excess of normal voltage progressively appear thereacross a rapidly decreasing impedance is presented by the cylinders in accordance with the alpha of the body of material, thereby limiting the voltage appearing between the leads and the casing of assembly 12.

Figure 5:
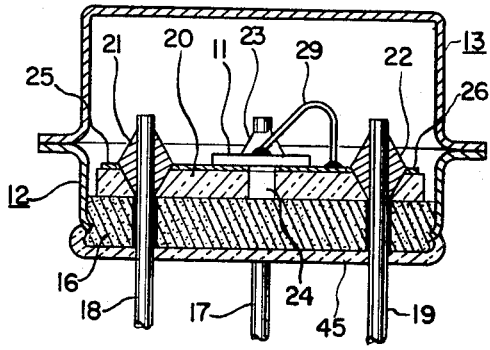
FIG. 5 is a side view in section of another embodiment of the present invention.

Reference is now made to FIG. 5 which shows a modification of the device of FIGS. 1 and 2 in which each of the elements of FIG. 5 identical to the elements of FIG. 2 are designated by the same reference numeral. In this figure, the outer exposed surface of the base portion 16 metal oxide varistor material is covered with a glass layer 45 which may be applied by any of a variety of techniques known in the art to provide further sealing against environmental influences. In feed-through assemblies in which the conductive contact between the electrodes of the assembly, which may include conductive casings, and the body of metal oxide varistor material do not provide a hermetic seal, insulating coatings of a plastic such as epoxy as well as glass may be used to provide the hermetic seals.

Figure 6:
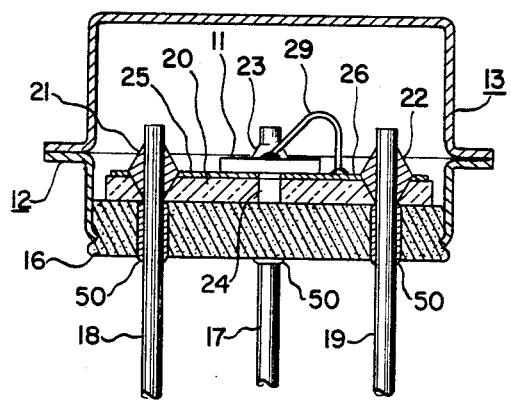
FIG. 6 is a side view in section of another embodiment of the present invention.

Reference is now made to FIG. 6 which shows another embodiment of the present invention, which is similar to the embodiment of FIG. 2, with the additional feature that a conductive glass sealing material 50 provides the conductive and hermetic bond between the body of metal oxide varistor material and each of leads 17, 18, and 19.

Figure 7:
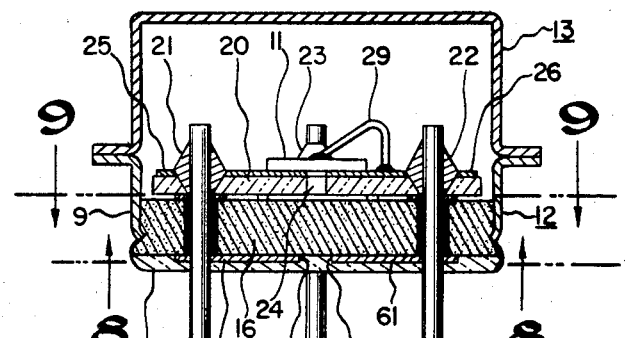
FIG. 7 is a side view in section of a further embodiment of the present invention.
Figure 8:
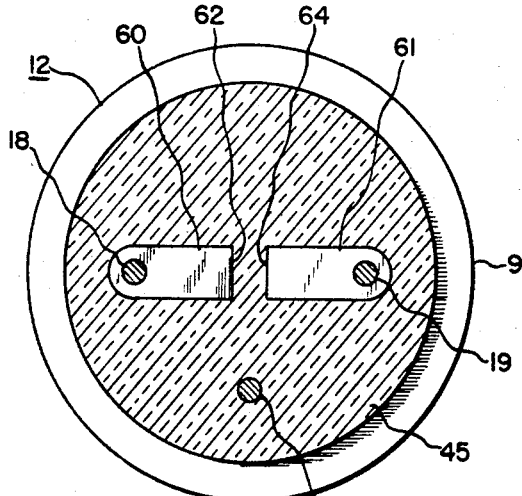
FIG. 8 is a bottom view of the device of FIG. 7 taken along section lines 8—8 of FIG. 7.
Figure 9:
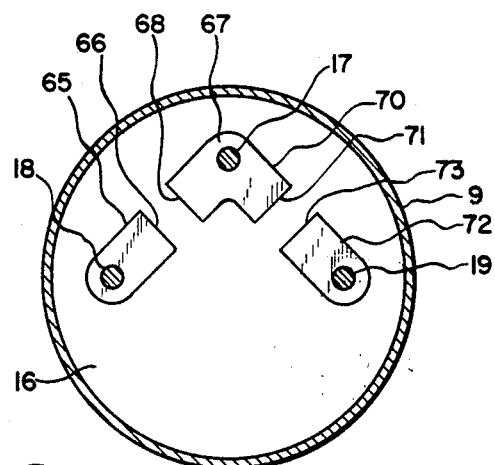
FIG. 9 is a top view of the device of FIG. 7 taken along section lines 9—9 of FIG. 7.

Reference is now made to FIG. 7 which shows another embodiment in accordance with the present invention, which is similar to the embodiment of FIG. 5, with the additional provision of a plurality of conductive layers or strips secured to the opposed surfaces of the metal oxide varistor body or wafer to enable greater flexibility to be achieved with respect to the voltage versus current characteristics between any pair of conducting electrodes. The elements of FIG. 7, identical to the elements of FIG. 4, are designated by the same numerals. In this figure, the metal oxide varistor wafer 16 has applied to one surface a pair of conductive strips 60 and 61, first strip 60 extending from the lead 18 and terminating in a straight edge 62 and a second strip 61 extending from the lead 19 also terminating in a straight edge 64 to form a gap with the first strip. The separation of the adjacent straight edges 62 and 64 of the strips 60 and 61 are set to provide the desired voltage versus current characteristic between the strips which limits the amplitude of transient voltage surges which may appear across the leads 18 and 19. The opposite surface of the wafer is also provided with metal strips. Metal strip 65 is in conductive contact with the electrode 18, extends a distance therefrom and terminates in a straight edge 66. Similarly, a conductive strip 67 extends from the lead 17 along a straight line between lead 17 and lead 18 and terminates in a straight edge 68 intermediate the distance between the two leads to form a gap with straight edge 66. Conductive strip 70 extends from the lead 17, extends a distance toward lead 19 and terminates in a straight edge 71. Similarly, strip 72 extends from the lead 19 and terminates in a straight edge 73 to form a gap therewith. The spacing of strips 65 and 67 is arranged to provide the desired voltage versus current characteristic between the leads 18 and 17 which limits the amplitude of transient voltage surges which may appear across leads 18 and 17. Similarly, the gap between strips 70 and 72 is arranged to provide a desired voltage versus current characteristic between the leads 17 and 19. Metal oxide varistor structures utilizing laterally spaced electrodes are also described and claimed in my copending patent application, Ser. No. 165,001, "Metal Oxide Varistor with Laterally Spaced Electrodes," filed July 22, 1971 and assigned to the assignee of the presnt application.

While the invention has been described in specific embodiments, it will be appreciated that modifications may be made by those skilled in the art and I intend by the appended claims to cover all such modifications as fall within the true spirit and scope of the invention.

What I claim as new and desire to secure by Letters Patent of the United States is:

1. A hermetically sealed electrical feed-through assembly comprising
a body of metallic oxide varistor material having a pair of opposed surfaces,
an elongated electrode extending through said body from one opposed surface to the other opposed surface thereof and hermetically sealed thereto by metallic means surrounding said electrode and in contact with said body, another electrode in conductive contact with said body.

2. The combination of claim 1 in which said material has an alpha in excess of 10 in the current density range of $10^{-3}$ to $10^2$ amperes per square centimeter.

3. The combination of claim 1 in which the portions of said body in contact with said electrodes are spaced to provide a current flow between said electrodes which is low when normal operating voltage appears across said electrodes and when voltages in excess of normal voltage progressively appear thereacross a rapidly decreasing impedance is presented by said body in accordance with the alpha of the body of material thereby limiting the voltage appearing between said electrodes.

4. The combination of claim 1 in which said other electrode is an elongated electrode and extends through said body from one opposed surface to the other opposed surface thereof.

5. The combination of claim 1 in which said other electrode is a conductive member which surrounds said body.

6. The combination of claim 1 in which one of said surfaces is provided with an insulating coating.

7. An electrical feed-through assembly comprising a wafer of metallic oxide varistor material having a pair of opposed surfaces, a plurality of elongated electrodes, each extending through said wafer from one opposed surface to the other opposed surface thereof and in conductive contact therewith, said material having an essentially constant alpha in excess of 10 in the current density range of $10^{-3}$ to $10^2$ amperes per square centimeter, the portions of said wafer in contact with said electrodes being spaced to provide a current flow between a pair of said electrodes which is low when normal operating voltage appears across said pair of electrodes and when voltages in excess of normal voltage appear thereacross a rapidly dereasing impedance is presented by said wafer in accordance with the alpha of the material of said wafer thereby limiting the voltage appearing between said pair of electrodes.

8. The combination of claim 7 in which one of said surfaces is provided with a pair of spaced conductive layers, each in conductive contact with a respective one of a pair of said electrodes, the distance between said layers along said one surface being set to obtain a desired normal operating point on the voltage versus current graph of one pair of electrodes.

9. The combination of claim 8 in which the other of said surfaces is provided with another pair of spaced conductive layers, each in conductive contact with a respective one of another pair of said electrodes, the distance between said other pair of layers along said other surface being set to obtain a desired normal operating point on the voltage versus current graph of said other pair of electrodes.

* * * * *